United States Patent Office 2,856,204
Patented Oct. 14, 1958

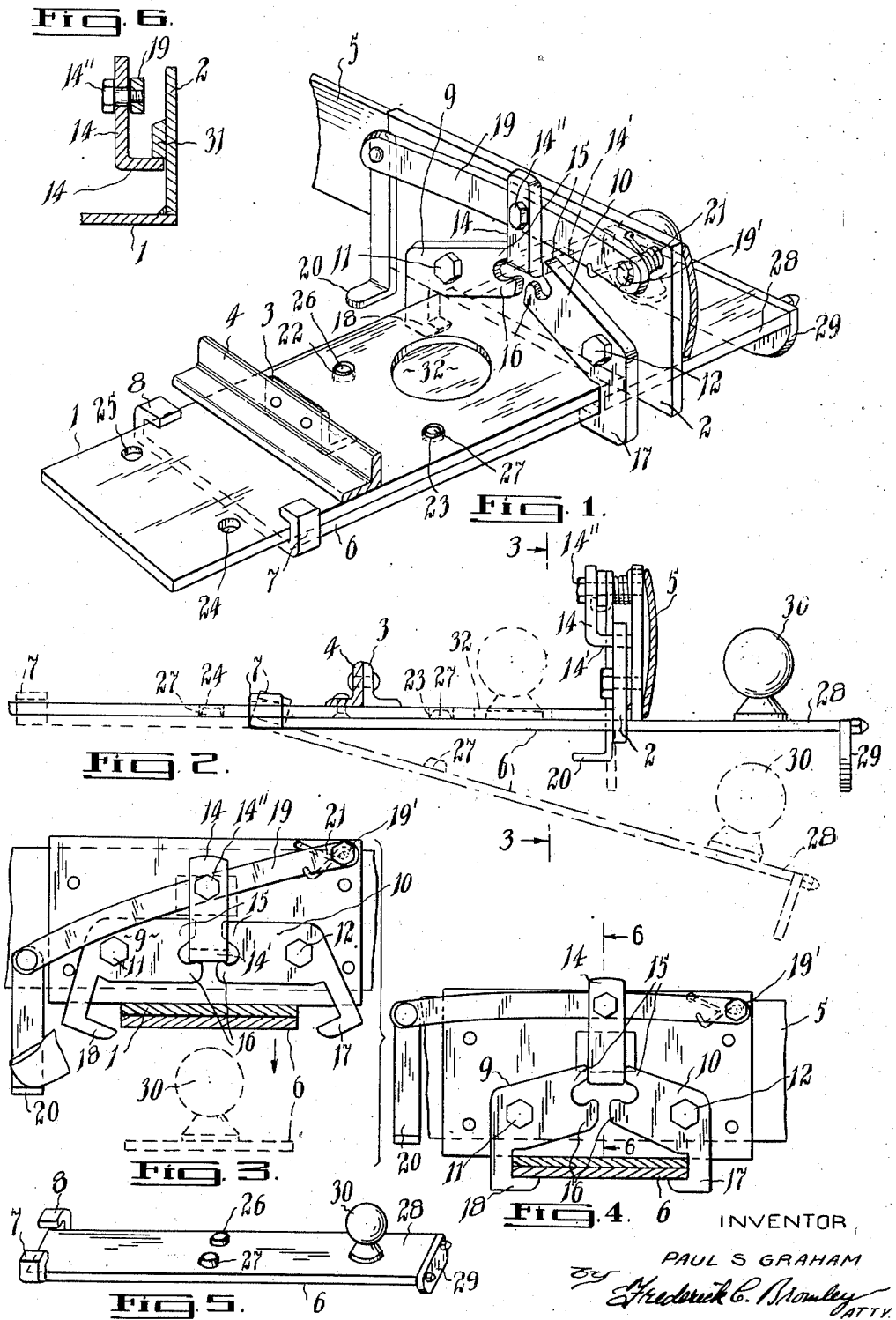

2,856,204

TRAILER HITCH FOR AUTOMOBILES

Paul S. Graham, Malton, Ontario, Canada

Application February 14, 1958, Serial No. 715,347

7 Claims. (Cl. 280—491)

This invention relates to trailer hitches and in particular to a retractable trailer hitch constructed and arranged for storing in concealed retracted attitude when not in use.

It is known to provide a trailer hitch wherein the hitch-ball is positioned on the end of a slide bar which protrudes through an aperture in the rear compartment of a vehicle and can be manually retracted and then locked up inside the compartment out of sight.

It is also known to provide a hitch-ball on a plate arrangement which is hinged and slung underneath the rear compartment of the vehicle. The plate is latched in operating attitude by a spring-loaded lever device and can be unlatched and turned sideways about a pivot to stow away underneath the rear compartment when not in use. A second latch device is designed to prevent the assembly from rattling when in the retracted attitude.

In another prior art arrangement of the kind discussed the hitch-ball is attached to the end of an L-shaped rod which is slidably mounted in a tubular sleeve. The ball and rod when extended are locked in the towing attitude by a collar and a set screw which requires to be withdrawn when the hitch is retractively turned and stowed under the vehicle when not required.

My invention aims to provide a more efficient and reliable trailer hitch having regard to such prior art arrangements, and moreover to supply a device of the kind referred to which affords a full measure of security and moreover is of a rugged character.

It is another object of this invention to provide a trailer hitch which is of amply sturdy construction both from the aspect of its locking arrangements and from its dependence for torque.

It is another object to provide a trailer hitch which is completely concealed from normal view when in retracted attitude.

It is still another object to provide a trailer hitch wherein the latching device is so designed that it cannot become inadvertently unlatched as by shock due to the towing vehicle travelling over rough roads, etc.

The invention comprehends an arrangement whereby a latching device co-operates with a simple hand lever for positively latching the hitch bar in either operative or retracted attitude.

The invention further includes a latching device which does not depend upon springs or set screws for maintaining the latched atitude against shock displacement, but rather upon a positive-action latching device of novel design.

The design of the hitch according to my invention also facilitates the incorporation therewith of an ornamental cover plate which blends in with the bumper bar of the vehicle to effectively conceal the hitch mechanism when retracted, and yet which does not interfere with the hitch when in the operative attitude.

These and other objects of the invention are achieved by a structure described in the ensuing specification and shown in the accompanying drawings, in which:

Fig. 1 shows a perspective view of a trailer hitch mechanism incorporating the features of my invention. It is shown as though mounted upon a vehicle of which certain structural members are shown in fragmentary form.

Fig. 2 is a side elevation of the structure shown in Fig. 1, the slide bar being depicted in solid lines in its position of use and in dash lines in its retracted position, and in a dropped position in dot and dash lines.

Fig. 3 is a cross section on line 3—3 of Fig. 2 and depicting the locking device in released position.

Fig. 4 is a similar cross section to Fig. 3 but illustrates the locking device in locked position.

Fig. 5 is a detail in perspective of the slide bar and ball hitch together with the ornamental cover plate.

Fig. 6 is a sectional detail along the line 6—6 of Fig. 4.

Referring to the drawings, 1 is a longitudinally arranged support plate integral with or secured at its outer end to a face plate 2 which supports a latch device. The support plate 1 has secured to it a thrust bracket 3 which is attached by any convenient fixing means, such as rivets, to a transverse structural element 4 which usually forms a part of the frame of a vehicle. The support plate 1 extends beneath the rear end of the vehicle and projects to the rear bumper. The face plate 2 is disposed at the inner side of the bumper bar 5.

The plate 1 carries a hitch plate 6 which is disposed therebeneath to slide lengthwise thereof. The plate 6 includes a pair of slide-clips 7, 8, at its inner end, which fold over the plate 1 and hold the plate 6 in loosely slidable condition which permits the front of the plate 6 to drop as shown in dot and dash lines in Fig. 2. The outer portions of plates 1 and 6 are normally held together in the raised condition of the latter plate by the latch mechanism which comprises two similar, but complementary and juxtaposed cantilever arms 9, 10, pivotally supported by bolt-like pivots designated respectively 11, 12, and attached to the face plate 2. The lower distal ends of latching members 9 and 10 each terminate in a re-entrant notch forming a latch designed to clasp over plates 1 and 6 in order to engage with the plate 6 and thus positively lock it in raised attitude as clearly shown in Fig. 4. When disengaged, these latching elements allow the plate 6 to drop with a hinge-like action about the clips 7 and 8. The dropped or lowered position is clearly shown in Fig. 2. In Fig. 4 the two plates 1 and 6 are seen locked firmly and positively together by a locking in the form of a latch actuator 14 member which forces the upper ends of the cantilever arms 9, 10, apart. The locking elements which force upper ends of the arms 9, 10 apart also locks them in that attitude so that they cannot be jarred or shaken out of that attitude. This is accomplished by the peculiar geometry of the adjacent ends of the arms 9, 10, and the co-operating latch actuator 14.

The respective juxtaposed ends of the arms 9, 10, are slotted to form two stubby tangs 15, 16, and the contour of the slots is such as to receive between them a finger element 14' formed by an inturned lower end of the latch actuator 14 which is an L-shaped member.

The L-shaped actuator 14 is pivoted at 14″ to arm 19 which in turn is pivoted at 19′ to the plate 2 and has an operating extension handle 20 which is pivotally attached to the one end of arm 19.

The cantilever arm 19 is thus pivotally mounted at an end to the face plate 2. It is spring-loaded toward an upward attitude by a torsional spring 21. This spring in pressing the lever arm 19 upwardly causes the actuator to act on the upper tangs 15 of the cantilever or bellcrank across 9 and 10 in order to force the latch clips or latching elements 17 and 18 inwardly so as to engage under the slide plate 6 and lock it when it is in raised position. Moreover, in moving upwardly the finger element 14' of the latch actuator 14 moves out of the slotted upper ends of the arms 9, 10, to a blocking position between the tangs 15 where it is held against further upward movement by a stop piece 31 on the face plate 2—see Fig. 6. In the fully raised position of the latch actuator 14 the latching arms 9 and 10 are thus positively locked against spreading apart to release the slide plate 6. By pulling downward on the handle 20 the arm 19 is lowered together with the latch actuator 14 which drops into the slotted ends of the latching arms 9 and 10, and continued downward movement causes the finger 14' to engage the lower tangs 16 and to thus spread the latching arms 9 and 10 whereby to free the slide plate 6 so that it may drop as heretofore recounted.

The support plate 1 is provided with apertures 22, 23, 24, 25, and the lower plate 6 includes two pins 26, 27, which are positioned to selectively engage in the outer apertures 22, 23, when the hitch plate 6 is projected for use. Apertures 24, 25, are engaged by pins 26, 27, when the hitch plate 6 is retracted for storage. The assembly is dimensioned so that the distance between the pairs 22, 23, and 24, 25, is the same as that required by vehicle design to provide the necessary length of extensile movement.

When in use as a hitch, the plate 6 is manually projected rearwardly so that the pins 26, 27, engage the holes 22, 23, and allow the plates to lie in a parallel keyed attitude. The latch arms 9 and 10 are employed in conjunction with clips 17, 18, to lock the slide plate in this position of use.

When it is desired to stow the hitch, the handle 20 is pulled downward to release the latch elements 17, 18, whereupon the hitch drops as shown in Fig. 2, dot and dash lines. The clips 7, 8, provide sufficient play for a limited downward angular movement of the slide plate but the slide plate is to be then grasped by hand and caused to slide inward and upward to close the angle and engage the pins 26, 27, in the apertures 24, 25, in plate 1. The ball end of the hitch is then brought into re-engagement with the latching clips 17, 18, whereupon the latch device is again closed and wedged by the locking element 14, thereby firmly retaining the hitch in its stowed attitude, where it is concealed by the bumper bar.

To aid in concealment, the hitch plate 6 may have on its outer end 28 an ornamental plate 29 which may be shaped as a decorative device, for example, to simulate a part of the chrome-plated bumper 5 thereby completely concealing the presence of the retracted hitch from normal view.

The slide plate 6 is shown as provided with the ball 30 which is commonly used as a part of a standard hitch connector for trailers in the present state of the art as a ball and socket connection. The large aperture 32 in plate 1 is provided to receive the ball 30 when the hitch is in stowed attitude.

It will be noted from Fig. 6 that the face plate 2 has a boss 31 which acts as the stop piece for the latch actuator 14 so that it cannot slip upwardly out of engagement with the tangs 15. This device completes the geometry of a latch device which can now be seen to provide a latching means which will remain operative despite excessive tractive effort.

It will be evident from the above that the disclosed structure provides an improved and more convenient trailer hitch for use on mobile vehicles and that simple and effective means has been provided whereby without the aid of separate parts or tools, the ball-hitch end of the device can be retracted and rigidly held in concealed attitude, where it cannot readily be seen and leaves no parts extended beyond the bumper to mar the appearance of the automobile.

It will be apparent that such changes and modifications may be resorted to as fairly come within the scope of the appended claims.

What I claim is:

1. A trailer hitch for a motor vehicle comprising a support plate for attachment to a relatively fixed part of a motor vehicle, a hitch plate disposed in a normally raised position immediately beneath said support plate and having an outer end and an inner end, a ball connector on the outer end of said hitch plate, attachment means connecting said hitch plate to said support plate in a manner to permit said hitch plate to slide longitudinally between a rear projected position and an inner retracted position of concealment and to permit the outer end of said hitch plate to drop divergently while the inner end thereof remains connected so that said ball connector may pass under an obstruction in sliding said hitch plate inwardly to its retracted position, keying means securing said hitch plate to said support plate when said hitch plate is in a normally raised rear projected position and also when said hitch plate is in an inner retracted position, and means for positively locking said hitch plate in a normally raised position aforesaid, and including a latching arm pivoted on said support plate to swing in a plane transversely of said hitch plate, said latching arm having a latching element at an end thereof for swinging under said hitch plate at a side thereof in a latching attitude, a controlled latch actuator having an operating connection with said latching arm and movable to a blocking position in which the said latching arm is blocked in a latching attitude, and a handle for said latch actuator.

2. A trailer hitch as defined in claim 1, in which the support plate is adapted to be attached to a rear part of the motor vehicle to extend to the rear bumper bar, and in which a face plate rigidly upstands from the rear end of said support plate for disposition at the inner side of said bumper bar to carry the locking means, said support plate having an aperture adapted to accommodate the ball connector in the inner retracted position of the hitch plate.

3. A trailer hitch as defined in claim 1, in which the attachment means connecting the hitch plate to the support plate comprises opposing guide pieces at opposite side edges of the hitch plate and embracing opposite edge portions of the support plate in a manner to permit of play to enable the hitch plate to drop at its rear end to a divergent attitude.

4. A trailer hitch for a motor vehicle comprising a support plate for attachment to a relatively fixed part of a motor vehicle, a hitch plate disposed in a normally raised position immediately beneath said support plate and having an outer end and an inner end, a ball connector on the outer end of said hitch plate, slide clips rigid with the inner end of said hitch plate and engaged with said support plate in a manner to permit said hitch plate to slide longitudinally between a rear projected position and an inner retracted position of concealment and to permit the outer end of said hitch plate to drop divergently while the inner end thereof remains connected so that said ball connector may pass under an obstruction in sliding said hitch plate inwardly to its retracted position, keying means securing said hitch plate to said support plate when said hitch plate is in a normally raised rear projected position and also when said hitch plate is in an inner retracted position, and means for positively locking said hitch plate in a normally raised position aforesaid, and including a latching arm pivoted on said support plate to swing in a plane transversely of said hitch plate, said latching arm having a latching element at an end thereof for swinging under said hitch plate at a side thereof in a latching attitude, a controlled latch actuator having an operating connection with said latching arm and movable to a blocking position in which the said latching arm is blocked in a latching attitude, and a handle for said latch actuator.

5. A trailer hitch as defined in claim 1, in which the keying means comprises a pin upstanding from the hitch plate for interfitting engagement with the support plate by means of the provision of a suitably located aperture in said support plate.

6. A trailer hitch as defined in claim 1, in which the latching arm is a bellcrank having a slotted arm portion, and in which the latch actuator is supported to slide transversely of said slotted arm portion and is provided with a finger part which engages in said slotted arm portion to actuate said bellcrank and is movable out of the slot of said arm portion to abut said arm in a manner to block the bellcrank against movement from a latching position.

7. A trailer hitch for a motor vehicle comprising a support plate for attachment to a relatively fixed part of a motor vehicle, a hitch plate disposed in a normally raised position immediately beneath said support plate and having an outer end and an inner end, a ball connector on the outer end of said hitch plate, attachment means connecting said hitch to said support plate in a manner to permit said hitch plate to slide longitudinally between a rear projected position and an inner retracted position of concealment and to permit the outer end of said hitch plate to drop divergently while the inner end thereof remains connected so that said ball connector may pass under an obstruction in sliding said hitch plate inwardly to its retracted position, keying means securing said hitch plate to said support plate when said hitch plate is in a normally raised rear projected position and also when said hitch plate is in an inner retracted position, and means for positively locking said hitch plate in a normally raised position aforesaid, and including a pair of oppositely disposed latching arms pivotally supported on said support plate and in the form of bellcranks having latching elements for swinging under said hitch plate at opposite sides thereof, said latching arms having confronting slotted ends, a cantilever arm pivoted on said support plate and upwardly urged by spring pressure, a handle on said cantilever arm, and a latch actuator pivoted on said cantilever arm and having an inturned finger engageable in said slotted ends of the latching arms and movable out of said slotted ends to a blocking position.

References Cited in the file of this patent

UNITED STATES PATENTS

| | | |
|---|---|---|
| 793,787 | Heser | July 4, 1905 |
| 2,685,457 | Van Zee | Aug. 3, 1954 |

FOREIGN PATENTS

| | | |
|---|---|---|
| 375,840 | Germany | May 18, 1923 |